United States Patent [19]

Hein

[11] Patent Number: 5,338,011

[45] Date of Patent: Aug. 16, 1994

[54] FORCE DAMPENING TORQUE STRUT FOR AN AUTOMOBILE ENGINE

[75] Inventor: Richard D. Hein, Wabash, Ind.

[73] Assignee: GenCorp Inc., Fairlawn, Ohio

[21] Appl. No.: 28,513

[22] Filed: Mar. 9, 1993

[51] Int. Cl.$^5$ ............................................. F16M 7/00
[52] U.S. Cl. ............................... 267/140.12; 267/140; 180/312
[58] Field of Search ............. 267/140.12, 141.1, 141.2, 267/219, 139, 140, 292–294, 282; 248/636; 180/300, 312; 188/268, 129

[56] References Cited

U.S. PATENT DOCUMENTS

| | | | |
|---|---|---|---|
| 2,179,959 | 11/1939 | Schroedter | 267/293 |
| 3,435,919 | 4/1969 | Gularte et al. | 188/129 |
| 3,820,634 | 6/1974 | Poe | 188/129 |
| 4,385,665 | 5/1983 | Knoll | 267/140 |
| 4,647,025 | 3/1987 | Gold | 267/140 |
| 5,026,226 | 6/1991 | Hollowell et al. | 267/139 |

Primary Examiner—Robert J. Oberleitner
Assistant Examiner—Chris Schwartz
Attorney, Agent, or Firm—Robert F. Rywalski; Frank C. Rote, Jr.; Louis J. Weisz

[57] ABSTRACT

A torque strut for an automobile engine is described as having a unique energy absorbing housing in which is mounted a unique energy absorbing device which has a block-shaped center piece from which a pair of resilient rubber shock absorbers extend in opposite directions for receipt in a pair of adjacent cavities which are formed in the housing. The farthest spaced opposing ends of the rubber shock absorbers are free of the housing, but are designed to compressively engage adjacent ends of the cavities and fill the cavities when the shock absorbers are compressively expanded in the cavities, as a result of forward or reverse roll of the engine. A rolling rubber torus with a special mechanism for interlocking engagement with the device, is provided to stabilize the position of the energy absorbing device within the housing of the torque strut.

13 Claims, 1 Drawing Sheet

FORCE DAMPENING TORQUE STRUT FOR AN AUTOMOBILE ENGINE

BACKGROUND OF THE INVENTION

This invention relates to automotive torque struts, especially the resilient, elastomeric energy absorbing devices which are used within the struts to dampen or absorb loads imparted to the struts by the engine roll of a vehicle which may employ one or more torque struts.

The invention also relates to an improvement in the resilient rolling torus or ring which is disclosed in my U.S. Pat. No. 5,005,811 which shows and describes a rubber torus which has opposing segments which are dissimilar, rather than segments which have the same cross sections, as disclosed in U.S. Pat. Nos. 2,819,060 and 2,819,063.

One of the problems associated with the use of a resilient rolling torus or ring in an energy absorbing device involves the retention of the ring in its proper position, since under severe conditions the torus can roll so far out of position that it adversely affects the operation of the device. The invention is designed to solve this problem by providing a mechanism for controlling the movement in the device of the rolling torus in the torque strut.

Briefly stated, the invention is a torque strut which has a hollow housing in which a separate, resilient, elastomer energy absorbing device is mounted. The device comprises a pair of oppositely disposed, resilient elastomeric snubbers or shock absorbers which are separate from adjacent abutting ends of the housing and includes a resilient, rolling torus which is provided with means for restricting movement of the torus on the device so that the torus is maintained in a desired position on the device.

DESCRIPTION OF THE DRAWING

The following description of the invention will be better understood by having reference to the accompanying drawing, wherein.

DETAILED DESCRIPTION OF THE DRAWING

Figure 1:
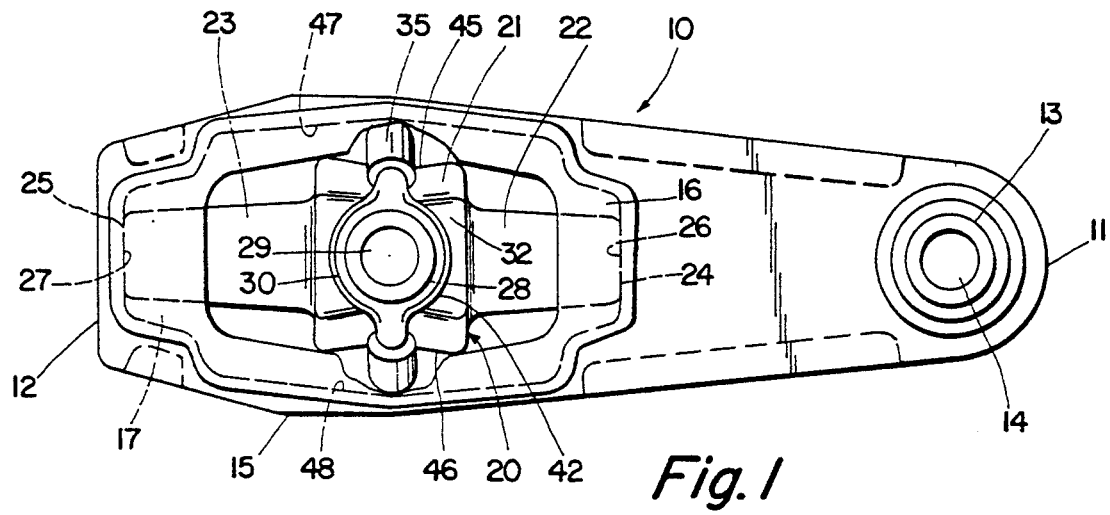
FIG. 1 is a plan view of an automotive torque strut which is made in accordance with the invention, the strut having portions removed to show the unique energy absorbing device and resilient, rolling torus with the device.
Figure 2:
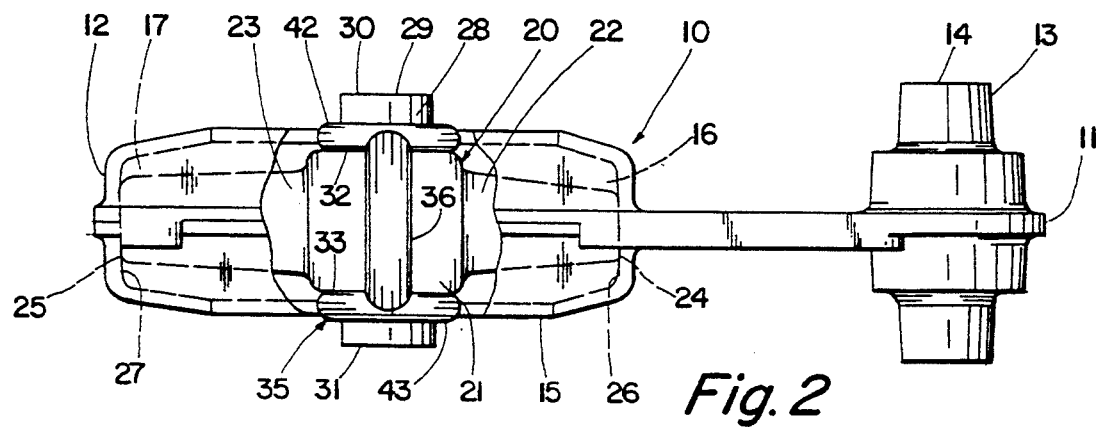
FIG. 2 is a side view of the torque strut with portions removed to show the energy absorbing device and rolling torus.

With general reference to the drawing for like parts, and particular reference to FIGS. 1 and 2, there is shown a torque strut 10 which is designed to be coupled between a vehicle frame and engine (not shown) to absorb or dampen the roll of the engine during operation of the vehicle. The strut 10, as seen in FIG. 1, has a relatively narrower end 11 compared to an opposed spaced wider end 12. The narrower end 11 of the strut 10 includes a hollow shaft 13 with a center bore 14 which is designed to receive a bolt by which the automobile engine is secured to the strut 10. The wider end 12 of the strut 10 includes a hollow housing 15 which has a pair of oppositely disposed, axially aligned cavities 16,17, each of which has sloping sides which converge in a direction away from the opposing cavity.

An energy absorbing device 20 is disposed within the housing 15, and essentially comprises a generally block-shaped center piece 21 with a pair of axially aligned, resilient elastomeric snubbers or shock absorbers 22,23, which extend from the center piece 21 in opposite directions. The shock absorbers 22,23 are composed of any suitable elastomeric material, e.g. rubber, and are integrally formed with, or bonded to the center piece 21, depending on whether the center piece 21 is formed of rubber or metal. The shock absorbers 22,23 may be cylindrical, but in this case are frustrum-conically shaped having their farthest spaced apart, smaller diameter ends 24,25, in abutting engagement with the adjacent opposing ends 26,27 of the two cavities 16,17. In some instances, the shock absorbers 22,23, may be provided with axially oriented voids where a softer, initial spring rate is desired. The shock absorber 22, closest the mounting shaft 13 of the engine, is shorter, in length, measured axially than the opposing shock absorber 23, because the shorter shock absorber 22 comes into play when the automobile is in reverse and engine roll is forward where less travel of the shorter shock absorber 22 is required to become sufficiently compressed and distorted and flattened to fill the adjacent smaller cavity 16. The longer shock absorber 23 similarly becomes distorted to fill the adjacent larger cavity 17, when the automobile is in forward and engine roll is reverse. In both cases, the rubber shock absorbers 22,23 are never in tension, as is the case of known torque struts where the rubber snubbers or shock absorbers are secured to the adjacent ends of the cavities or housing of the torque strut.

The center piece 21 has a centrally disposed, metal shaft 28 which has a center bore 29 and a pair of opposing ends 30,31, which protrude from the adjacent opposing sides 32,33, of the center piece 21. The bore 29 of the shaft 28 of the energy absorbing device 20 is designed to receive a bolt which is used to secure the device 20 to the automobile body or chassis (not shown). The longitudinal axes of the two bolt receiving shafts 13 and 28 are normal to the center axis of the aligned shock absorbers 22 and 23 and may be in the same plane in some instances.

Figures 3, 4, 5:
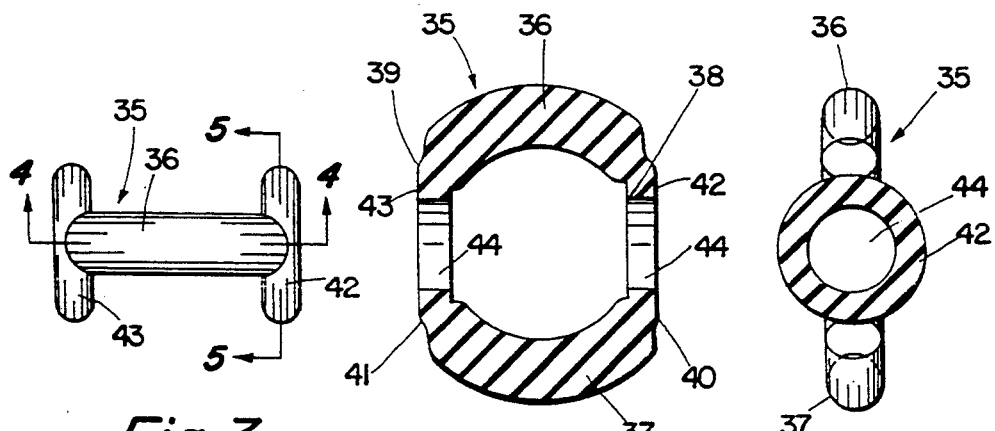
FIG. 3 is a plane view of the rolling torus.
FIG. 4 is a section of the torus viewed from the line 4—4 of FIG. 3.
FIG. 5 is a section of the torus viewed from the line 5—5 of FIG. 3.

A rolling torus 35, composed of any appropriate, resilient elastomeric material, e.g. rubber, is provided for stabilizing the position of the energy absorbing device 20 within the housing 15 of the torque strut 10. The rolling torus 35, as best seen in FIGS. 3-5, comprises a pair of oppositely disposed, arcuate segments 36,37, each of which has a circular cross-section when viewed in a plane intersecting the segments 36,37 at right angles between the opposing ends 38,39 and 40,41 of the similarly shaped segments 36,37. A pair of similarly sized, annular rings 42,43 connect the adjacent opposing ends 38,40 and 39,41 of the two segments 36,37. The twin rings 42,43 as best seen in FIG. 3, are in parallel planes which are normal to the common plane of the two, substantially larger arcuate segments 36,37. The twin rings 42,43 have the same size center openings 44, FIG. 5, which are designed to encircle the protruding ends 30,31 of the shaft 28 of the energy absorbing device 20. In this way, the two arcuate segments 36,37 are firmly anchored in place on opposing sides 45,46, FIG. 1, of the center piece 21 for compressive engagement with the adjacent opposing sides 47,48 of the housing 15. It can be appreciated that this unique torus design prevents the torus 35 from rolling off the center piece 21 or at least sufficiently out of position where operation of the energy absorbing device 20 is adversely affected.

There has been described a unique torque strut which has a resilient energy absorbing device which is separate from the rigid metal housing of the torque strut and not attached thereto, and which employs a unique rubber rolling torus for stabilizing the position of the energy absorbing device within the housing of the torque strut to eliminate or substantially reduce any squeaking noise caused by relative motion between adjacent contacting parts during operation of the torque strut.

I claim:

1. A torque strut for an engine, comprising:
   (a) a hollow rigid housing having a pair of axially aligned cavities with a pair of oppositely spaced ends;
   (b) an energy absorbing device mounted within the housing of the torque strut, the device having (i) a center piece having a generally block shape with a pair of opposing ends, (ii) a hollow metal shaft extending transversely through the center piece and having a pair of opposing ends which protrude from the center piece, the shaft having a center bore for receiving a bolt used to fasten the torque strut to an adjacent member, and (iii) a pair of resilient elastomeric shock absorbers secured to the opposing ends of the center piece and extending in opposite directions therefrom for engaging adjacent opposing ends of the cavities, the shock absorbers being separate from the housing and ends of the cavities and not attached thereto; and
   (c) means carried by the energy absorbing device for maintaining the device in a desired position within the housing of the torque strut, as the device moves axially within the housing, said means including:
   (d) a rolling torus composed of resilient elastomeric material and having a pair of oppositely disposed segments coacting between the housing and center piece; and
   (e) means coacting between adjacent opposing ends of the segments for interlocking engagement with the device to stabilize the position of the rolling torus on the device.

2. The torque strut of claim 1, wherein the position stabilizing means for the rolling torus includes a pair of rings which are designed to encircle adjacent protruding ends of the shaft.

3. The torque strut of claim 2, wherein the shock absorbers are each composed of rubber and are frustrum-conically shaped having a smaller diameter end opposite a larger diameter end, and the smaller diameter ends of the shock absorbers are farthest spaced from the center piece.

4. The torque strut of claim 3, wherein the center piece is composed of material selected from the group of elastomeric material and metal.

5. The torque strut of claim 4, wherein each of the shock absorbers has an initial spring rate and includes at least one axially oriented void to soften the initial spring rate of the shock absorbers.

6. A torque strut for an engine, comprising:
   (a) a hollow, rigid metal housing having a pair of solid, opposing ends within the housing;
   (b) an energy absorbing device disposed within the housing, the device having a pair of axially aligned, resilient elastomeric shock absorbers extending from each other for contacting the adjacent opposing ends of the housing to dampen roll of the engine;
   (c) a resilient elastomeric rolling torus mounted on the device between the shock absorbers for rolling engagement with adjacent sides of the housing, the torus including a pair of oppositely curved segments with adjacently spaced opposing ends; and
   (d) means coacting between the adjacent opposing ends of the segments for interlocking relationship with the device to stabilize the position of the torus on the device, said means including a pair of resilient elastomeric rings encircling a pair of opposing ends of a hollow metal shaft protruding from the device midway between the shock absorbers.

7. The torque strut of claim 6, wherein the shock absorbers are frustrum-conically shaped wherein the farthest spaced free ends of the shock absorbers have a smaller diameter and are separate from, and unattached to, the adjacent opposing ends of the housing.

8. The torque strut of claim 7, wherein the elastomeric material of the shock absorbers and rolling torus is rubber.

9. The torque strut of claim 8, wherein each of the shock absorbers has an initial spring rate, and includes at least one axially oriented void to soften the initial spring rate of the shock absorbers.

10. The torque strut of claim 6, which includes a second hollow metal shaft which is disposed on the housing in generally parallel relation with the first mentioned hollow metal shaft which protrudes from the device, the shafts being designed to receive bolts which are used to secure the shafts to different, adjacent members.

11. A torque strut for an engine, comprising:
    (a) a hollow rigid housing having a longitudinal axis and a pair of oppositely disposed, axially aligned, similar cavities which are concentrically disposed about the longitudinal axis of the housing, the cavities having a pair of oppositely spaced, solid ends;
    (b) an energy absorbing device mounted within the housing of the torque strut, the device having (i) a generally block-shaped center piece, and (ii) a pair of oppositely disposed, axially aligned, identically shaped, resilient elastomeric shock absorbers which are integral with and extend from the center piece into the cavities and engage the oppositely spaced ends thereof, the shock absorbers being separate from the housing and ends of the cavities and not attached thereto; and
    (c) means carried by the energy absorbing device for maintaining the device in a desired position within the housing of the torque strut, as the device moves axially within the housing.

12. The torque strut of claim 11, wherein the means includes:
    (d) a rolling torus composed of resilient elastomeric material, the torus having a pair of oppositely disposed segments coacting between the housing and device midway between the shock absorbers; and
    (e) means coating between adjacent opposing ends of the segments for interlocking engagement with the device to stabilize the position of the rolling torus on the device.

13. A torque strut for an engine, comprising:
    (a) a hollow, rigid metal housing having a pair of solid, opposing ends within the housing;

(b) an energy absorbing device disposed within the housing, the device having a pair of oppositely disposed, identically shaped, axially aligned, resilient elastomeric shock absorbers extending from a centerpiece that contact the adjacent opposing ends of the housing to dampen roll of the engine;

(c) a hollow resilient elastomeric rolling torus mounted on the device between the shock absorbers for rolling engagement with adjacent sides of the housing, the torus including a pair of oppositely curved segments with adjacently spaced opposing ends; and (d) means coacting between the adjacent opposing ends of the segments for interlocking relationship with the device to stabilize the position of the torus on the device.

* * * * *